United States Patent
Otani et al.

(10) Patent No.: US 7,639,795 B2
(45) Date of Patent: Dec. 29, 2009

(54) HINGE DEVICE AND METHOD FOR WIRELESS COMMUNICATION DEVICE

(75) Inventors: Kazuyoshi R. Otani, San Diego, CA (US); Eugene Chekal, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 402 days.

(21) Appl. No.: 11/613,132

(22) Filed: Dec. 19, 2006

(65) Prior Publication Data

US 2008/0146273 A1  Jun. 19, 2008

(51) Int. Cl.
  *H04M 1/00* (2006.01)
  *H04M 9/00* (2006.01)
(52) U.S. Cl. .............................. 379/433.13; 379/428.01; 379/434; 455/575.3
(58) Field of Classification Search .............. 455/575.3, 455/575.1; 379/428.01, 433.01, 433.13, 379/434
See application file for complete search history.

(56) References Cited

U.S. PATENT DOCUMENTS

| 294,746 | A | 3/1884 | Straup et al. |
| 6,330,996 | B1 | 12/2001 | Yo et al. |
| 6,671,929 | B1 | 1/2004 | Lu |
| 7,016,712 | B2 * | 3/2006 | Newman et al. .......... 455/575.3 |
| 7,196,672 | B2 * | 3/2007 | Iwai et al. ................... 343/702 |
| 7,483,723 | B2 * | 1/2009 | Soderlund ................ 455/575.1 |
| 2003/0162509 | A1 | 8/2003 | Bae et al. |
| 2004/0078932 | A1 | 4/2004 | Su |
| 2004/0154130 | A1 | 8/2004 | Lee et al. |
| 2006/0143863 | A1 | 7/2006 | Schoolcraft et al. |
| 2009/0000062 | A1 * | 1/2009 | Yamanami ................... 16/366 |

FOREIGN PATENT DOCUMENTS

| JP | 1997-112514 | 5/1997 |
| JP | 1997-114162 | 5/1997 |
| JP | 2004-226530 | 8/2004 |
| JP | 2005-106117 | 4/2005 |

* cited by examiner

*Primary Examiner*—Curtis Kuntz
*Assistant Examiner*—Phylesha Dabney

(57) ABSTRACT

A wireless communication device includes a first housing member, a second housing member, and a S hinge pivotally connecting the first housing member to the second housing member. In certain embodiments, the S hinge comprises a left tail connected at one end to a single location along a first edge of the first housing member, and a right tail connected at one end to a second end of the left tail. The right tail is further connected at a second end to a single location along a first edge of the second housing member.

14 Claims, 1 Drawing Sheet

HINGE DEVICE AND METHOD FOR WIRELESS COMMUNICATION DEVICE

FIELD OF THE INVENTION

The present invention generally relates to wireless communication devices and more particularly relates to wireless communication devices including hinged connectors for coupling housing members of the wireless communication device together.

BACKGROUND

Hinged connectors and pivot connectors have been used in wireless communication devices (e.g., cellular handsets) in the past to pivotally connect a first housing member to a second housing member. For example, in a traditional flip phone or clamshell design, a first housing member including a monitor is pivotally attached to a second housing member including a keypad. A hinge that extends the entire length of the edges of the housing members pivotally connects the housing members together.

SUMMARY

A first aspect of the invention involves the use of a S hinge in a wireless communication device to connect a first housing member to a second housing member. The S hinge includes one or more hard resilient load transfer mechanisms (e.g., rubber grommet(s)) to surround one or more fasteners attaching the S hinge arm to the housing members. In this manner, the load transfer mechanism(s) will help absorb the load transferred to the points of connection between the S hinge arm and the housing members. The load transfer mechanism (s) also isolate the S hinge from the housing member, and allow for a more robust wireless communication device without the use of large screws, making the wireless communication device smaller.

In a further implementation of the above aspect of the invention, the S hinge incorporates a camera module therein. The camera module is rotatable to take an image (e.g., still image(s), video(s)) of a user on a monitor/keypad side of the wireless communication device and to take an image of objects on an opposite side of the wireless communication device from the monitor/keypad side, while previewing the image on a display of the wireless communication device. Incorporating the camera module into the S hinge makes more room available in the first housing member and/or the second housing member for other components.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
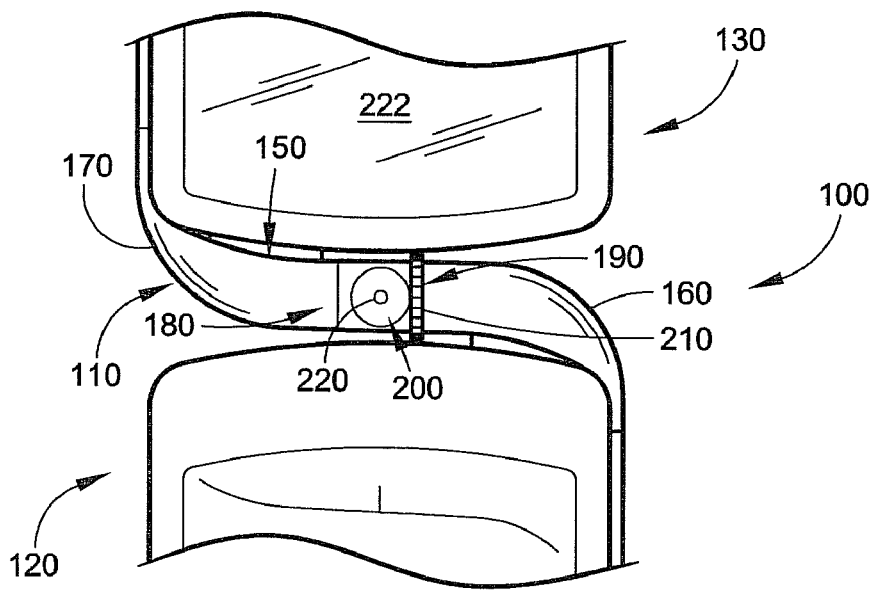
FIG. 1 is a partial front elevational view of an embodiment of a wireless communication device including a S hinge with a camera module incorporated therein.
Figure 2:
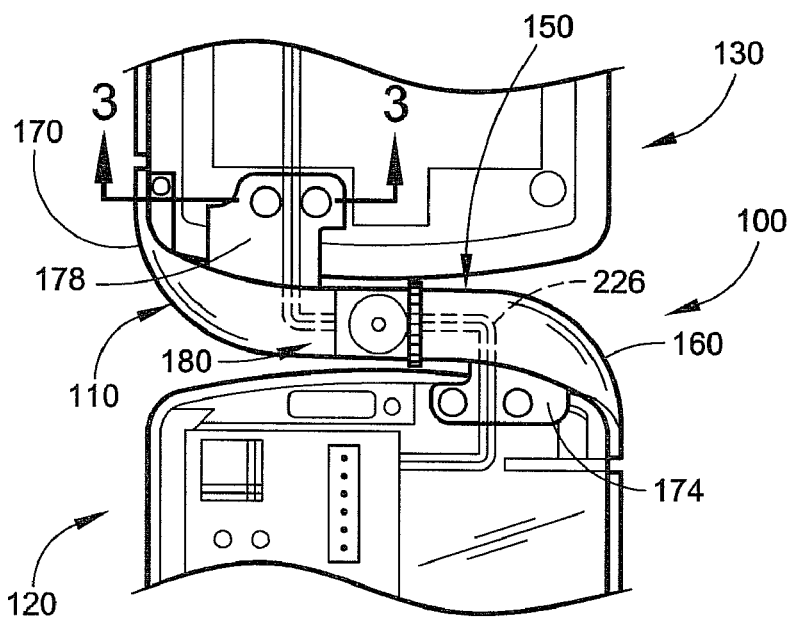
FIG. 2 is a partial cross-sectional view of the wireless communication device of FIG. 1, and illustrates an embodiment of a load transfer mechanism for attaching the S hinge arm to first and second housing members of the wireless communication device.

With reference to FIGS. 1 and 2, certain embodiments as disclosed herein provide for wireless communication device 100 including S hinge 110 for pivotally connecting first housing member 120 to second housing member 130. The wireless communication device 100 comprises components (not shown) for communicating wireless signals, including a processor coupled to a memory and to a transceiver. The transceiver is further connected to an antenna for communicating signals, e.g., in the radio frequency spectrum.

As used herein, "S hinge" refers to a single point hinge. Each connection between the S hinge and the first housing member 120 occurs at a single point/location, as opposed to along the entire (or substantially the entire) top edge of the first housing member 120. Similarly, each connection between the S hinge and the second housing member 130 occurs at a single point/location, as opposed to along the entire (or substantially the entire) bottom edge of the second housing member 130. Wireless communication device 100 includes hard resilient load transfer mechanisms 250 where S hinge 110 connects to housing members 120, 130.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

S hinge 110 is made of hard or rigid material, such as plastic, and includes hollow body 150 with right tail 160 having an downward curve and left tail 170 having an upward curve. In an alternative embodiment, right tail 160 has an upward curve and right tail 170 has a downward curve. Extending downwardly from right tail 160 is S hinge arm 174 and extending upwardly from left tail 170 is S hinge arm 178.

In an embodiment of the invention, digital camera module 180 is disposed within hollow body 150 of S hinge 110. Digital camera module 180 includes rotatable portion 190 with camera head 200 therein. Rotation control mechanism 210 enables a user to rotate camera head 200 between at least a first position, where lens 220 of camera head 200 faces a user operating wireless communication device 100 so that one can take images of oneself, and a second position, opposite first position, where lens 220 of camera head 200 faces away from user so that one can take images of objects, while previewing on display 222. As shown in FIG. 2, camera module 180 includes appropriate wiring and/or electronics 226 for control and operation of camera module 180.

Although in the embodiment shown, S hinge 110 includes camera module 180, in alternative embodiments, S hinge includes one or more additional or alternative components (e.g., input key(s), scroll wheel(s), on/off button) that would normally reside within first housing member 120 and/or second housing member 130 of wireless communication device 100. With camera module 180 disposed inside S hinge 110 (and/or other components disposed inside S hinge 110), more area is available in first housing member 120 and/or second housing member 130 for other components. In other embodiments, no additional components are incorporated within S hinge 100, even though the S hinge can provide for the routing of signal lines and/or power supply lines (e.g., S hinge 110 may not include digital camera module 180 in certain embodiments).

With reference to FIG. 2, first housing member 120 is connected to S hinge 110 at a first connection location through downwardly extending S hinge arm 174. Similarly, second housing member 130 is connected to S hinge 110 at a second connection location through upwardly extending S hinge arm 178.

Figure 3:
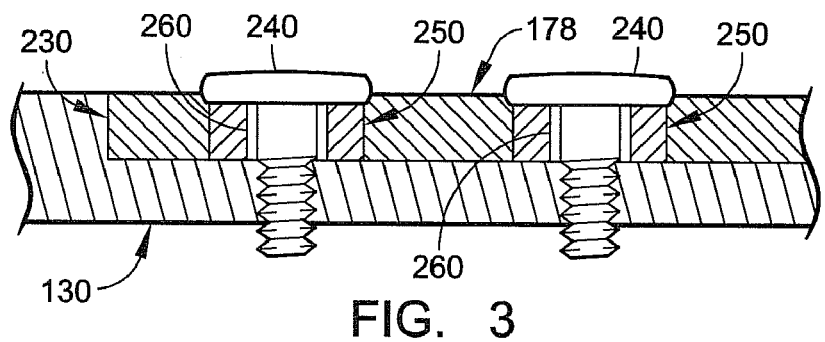
FIG. 3 is a partial cross sectional view of a second housing member of the wireless communication device taken along line 3-3 of FIG. 2, and illustrates the load transfer mechanism, a S hinge arm, and fasteners for attaching the second housing member to the S hinge arm.

With reference to FIG. 3, an upper portion of S hinge arm 178 is disposed within recess 230 of second housing member 130. One or more threaded fasteners (e.g., a pair of screws) 240 are screwed into threaded female sections of second housing member 130 to attach S hinge arm 178 to second housing member 130. One or more hard resilient annular load transfer mechanisms (e.g., annular rubber grommets) 250 circumferentially surround the shafts of one or more threaded fasteners 240 and are disposed within circular recesses of S hinge arm 178. Load transfer mechanism(s) 250 are disposed on top of an upper surface of second housing member 130 (within recess 230). Optional metal ring(s) 260 circumferentially surround the shaft of threaded fastener(s) 240 and are disposed external to the shaft(s) of threaded fastener(s) 240 and internal to load transfer mechanism(s) 250.

Because S hinge 110 is a single point/location hinge, it carries a large load at the points/locations of connection with housing members 120, 130. Load transfer mechanism(s) 250 absorb the load transferred to the points/locations of connection between S hinge arm 178, housing members 120, 130, and threaded fasteners 240. Compared to not using load transfer mechanism(s) 250, load transfer mechanism(s) 250 also isolate S hinge 110 from second housing member 130, and allow for a more robust wireless communication device 100 without the use of large screws, making wireless communication device 100 smaller.

S hinge arm 174 is connected to first housing member 120 in a similar manner to that described immediately above.

In use, wireless communication device is opened 100 by pivoting first housing member 120 and second housing member 130 relative to each other about S hinge 110 to an open condition. In one embodiment, this opening step actuates a switch to turn wireless communication device 100 automatically on and/or answer an incoming call. In the same embodiment or a different embodiment, an on/off button is actuatable to turn wireless communication device 100 on/off.

Hard resilient load transfer mechanisms 250 absorb load at connection locations between first housing member 120 and S hinge 110 and second housing member 130 and S hinge.

In the embodiment where S hinge 110 includes digital camera module 180, a user rotates rotation control mechanism 210 to cause rotatable portion 190 and camera head 200 to be rotated so that lens 220 of camera head 200 either faces the user or faces an object. Camera module 180 obtains image (s) of the user or object(s) depending on the direction that lens 220 of camera head 200 faces. The user previews the image(s) obtained by camera module 180 on display 228. Actuation of one or more input buttons of wireless communication device 100 saves and/or displays the image(s).

If wireless communication device 100 is to be closed but remain on, wireless communication device is closed 100 by pivoting first housing member 120 and second housing member 130 relative to each other about S hinge 110 to a closed condition. If wireless communication device 100 is to be turned off and closed, on/off button is actuated to turn wireless communication device 100 before closing wireless communication device 100.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A wireless communication device comprising:
   a first housing member having a first edge, an opposite second edge, a left side and an opposite right side;
   a second housing member having a first edge, an opposite second edge, a left side and an opposite right side;
   an antenna mounted to one of the first and second housing members;
   a transceiver connected to the antenna and housed within one of the first and second housing members; and
   a S-shaped hinge pivotally connecting the first housing member at an off-centered single location along the first edge adjacent at least one of the left side and the right side to the second housing member at an off-centered single location along the first edge adjacent a side opposite to the connection of the S-shaped hinge to the first housing member.

2. The wireless communication device of claim 1, wherein the S-shaped hinge comprises:
   a left tail connected at one end to the off-centered single location along the first edge of the first housing member; and
   a right tail connected at one end to a second end of the left tail, the right tail further connected at a second end to the off-centered single location along the first edge of the second housing member.

3. The wireless communication device of claim 2, wherein the left tail further comprises a left hinge arm, the right tail further comprising a right hinge arm, and each of the first and second housing members including a recess to receive the left hinge arm and right hinge arm, respectively.

4. The wireless communication device of claim 3, further comprising at least one hard resilient load transfer mechanism fastening each of the left hinge arm and the right hinge arm to the first and second housing members, respectively.

5. The wireless communication device of claim 4, further comprising at least one threaded fastener securing each of the left hinge arm and the right hinge arm to the first and second housing members, respectively.

6. The wireless communication device of claim 5, wherein the at least one hard resilient load transfer mechanism includes an annular rubber grommet circumferentially surrounding the at least one threaded fastener.

7. The wireless communication device of claim 6, further comprising at least one metal ring circumferentially disposed between the annular rubber grommet and the at least one threaded fastener.

8. The wireless communication device of claim 1, wherein the S-shaped hinge is connected to the first housing member at a first connection location and connected to the second housing member at a second connection location, and further including one or more hard resilient load transfer mechanisms at the first location to absorb load at the first connection location and one or more hard resilient load transfer mechanisms at the second location to absorb load at the second connection location.

9. The wireless communication device of claim 8, wherein the S-shaped hinge is connected to the first housing member at a first connection location by one or more threaded fasteners and connected to the second housing member at a second connection location by one or more threaded fasteners.

10. The wireless communication device of claim 9, wherein the one or more hard resilient load transfer mechanisms include annular rubber grommets circumferentially surrounding the one or more threaded fasteners.

11. The wireless communication device of claim 10, further including one or more metal rings circumferentially disposed between the annular rubber grommets and the one or more threaded fasteners.

12. The wireless communication device of claim 1, further including a camera module disposed in the S-shaped hinge.

13. The wireless communication device of claim 12, wherein the camera module includes a camera head rotatably coupled to the S-shaped hinge.

14. The wireless communication device of claim 13, further including a rotation control mechanism to rotate camera head relative to the S-shaped hinge.

* * * * *